July 29, 1958 A. W. MASSMAN 2,845,483
TELEVISION RECEIVER AUTOMATIC GAIN CONTROL CIRCUIT
Filed March 23, 1954
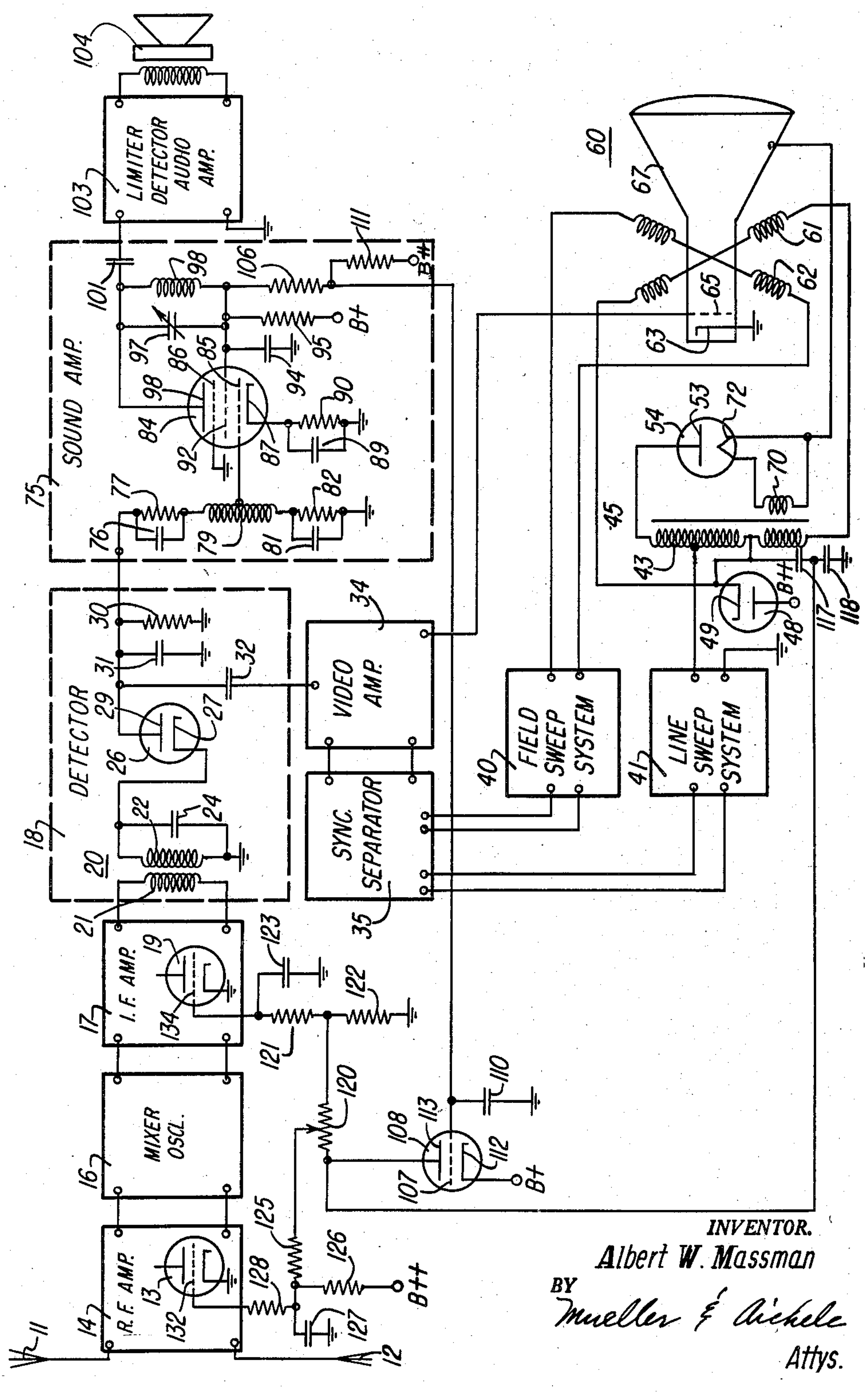
INVENTOR.
Albert W. Massman
BY Mueller & Aichele
Attys.

2,845,483

TELEVISION RECEIVER AUTOMATIC GAIN CONTROL CIRCUIT

Albert W. Massman, Wheaton, Ill., assignor to Motorola, Inc., Chicago, Ill., a corporation of Illinois Application March 23, 1954, Serial No. 418,127

4 Claims. (Cl. 178—5.8)

The present invention relates to automatic gain control circuits and more particularly to an improved automatic gain control circuit that is particularly suited for use in a television receiver or the like.

Many of the prior art automatic gain control (AGC) circuits for television receivers consist of a circuit wherein a bias voltage is developed and applied to the control grids of electron valves in radio frequency and intermediate frequency stages of the receiver to control the bias and regulate the amplification thereof. In order to provide a gain control signal of sufficient magnitude to produce a more uniform response over various signal intensities, some of these systems employ electron valves to amplify the signal before using it as a controlling bias for automatic regulation of gain. However, problems are encountered when it is attempted to amplify the control signal, since it is most desirable that the resulting amplified signal be negative with respect to ground and have an increasingly negative amplitude as the intensity of the received signal increases. This negative polarity is desired so that the cathodes of the controlled stages can be conveniently returned to ground.

It is also known to "gate" the automatic gain control circuit through a valve which conducts periodically so that a large portion of the television signal received by the receiver and which may contain undesirable noise components will not be introduced into the system, but only those portions of the received television signal necessary for the AGC action will be accepted. The gating valve may also provide amplification and a gain control signal of the desired negative polarity. However, when the detected composite video signal from the second detector or video amplifier of the receiver is used for AGC purposes and applied to such a valve, it has been necessary to employ a pentode gating valve to prevent feedback in the system, and in addition, gated AGC circuits of this type usually involve relatively complicated circuitry so as to make their additional cost incommensurate with the improved results attained thereby.

It is an object of the present invention to provide an improved automatic gain control circuit for a television receiver or the like which is both simple and inexpensive to construct, and which is capable of providing an amplified AGC signal of desired polarity for convenient control of the receiver.

It is a further object of the invention to provide for a television receiver an improved automatic gain control circuit which produces an amplified gain regulation potential of appropriate polarity through the use of a minimum number of components, and simple and inexpensive circuitry.

A feature of the invention is the provision of an automatic gain control system which derives a signal from the sound amplifier of a television receiver to produce an amplified unidirectional potential suitable for automatically controlling the gain of various stages in the receiver.

Another feature of the invention is the provision of an automatic gain control system that derives a direct-current voltage varying with signal intensity from the screen element of the sound amplifier of the television receiver, this voltage being applied to a triode gain control valve having a pulsed anode so that the amplified gain control voltage may be negative with respect to ground and vary in a manner to make it appropriate of AGC purposes.

Further objects, features and the attending advantages thereof will be apparent upon consideration of the following description when taken in conjunction with the diagram in which the figure represents a television receiver, partly schematic, employing the invention.

In accordance with the invention there is provided in a television receiver a sound amplifier including a multigrid valve and which is coupled by a direct-current path to the second detector of the receiver so that variations in the intensity of the detected television signal appear on the control grid of the valve. The anode element of this valve is coupled to further sound stages in the sound channel of the receiver to reproduce the audio signal in known manner. A unidirectional potential appears at the screen element of the sound amplifying valve which is proportional to signal strength of the received and detected television signal and which has been amplified in this valve. After filtering, the unidirectional potential is applied to an AGC amplifier valve to regulate the conduction thereof. The latter valve is rendered conductive periodically by a high potential positive pulse and produces an output potential which is negative with respect to ground, with its value becoming more negative as a greater unidirectional potential is coupled to this valve. This output potential is used to control the gain of the radio frequency and intermediate frequency stages of the receiver, and the system may be constructed so that this output potential must decrease to a certain value, that is, overcome a certain delay voltage, before actually reducing the gain of at least some of these stages.

Referring now to the drawing, the circuit shown will be described. Antenna 11, 12 is connected to a radio frequency amplifier 14 which contains one or more amplifying valves such as 13 and is coupled to a mixer oscillator or first detector 16. The output terminals of the mixer oscillator are connected to an intermediate frequency amplifier 17, and the latter has output terminals coupled to the primary winding 21 of a transformer 20 in the video or second detector circuit 18. Amplifier 17 may include one or more valves such as 19. The secondary winding 22 of transformer 20 has a tuning capacitor 24 connected across its terminals, and one end of this winding is connected to a point of reference potential or ground while the other end is connected to the cathode 27 of the detector diode electron valve 26. The anode element 29 of valve 26 is coupled to a capacitor 32 and also to a load resistor 30 and a bypass capacitor 31 which are both returned to ground.

Capacitor 32 also is connected to a video amplifier 34 which, in turn, is connected to a synchronizing signal separator 35. The field or vertical sweep system 40 and the line or horizontal sweep system 41 of the receiver are coupled to separator 35 in usual manner. The output terminals of the line sweep system are connected between the point of reference potential and a tap on winding 43 of a horizontal output transformer 45. The cathode 49 of a damping valve 48 is connected to a second tap on winding 43, and the anode element of the damping valve connected to a positive potential source B++. One end of winding 43 is connected to the anode element 53 of a high-voltage rectifier valve 54, and the other end of this winding is connected to the horizontal deflection coil 61 associated with a cathode-ray image reproducing tube 60. The horizontal deflection coil also has a connection to cathode 49 of damping valve 48. Vertical deflection coil 62 associated with cathode-ray tube 60 is connected across the output terminals of the field sweep system 40. Cathode-ray tube 60 has a cathode element 63 returned to the point of reference potential, and has a controlling element 65 connected to the output terminal of the video amplifier 34. To complete the circuitry of the video portion of the receiver, the filament 72 of rectifier valve 54 is connected to a filament winding 70 of transformer 45, and one side of the filament is connected to the beam accelerating electrode 67 of cathode-ray tube 60 through a suitable connection.

The sound portion of the receiver includes a sound amplifier 75 which has an input circuit connected to anode 29 of detector valve 26. This input circuit comprises a parallel combination of capacitor 76 and resistor 77 connected from anode 29 of diode 26 to coil 79, while the other side of the coil is connected to a parallel combination of capacitor 81 and resistor 82, the latter combination being returned to the point of reference potential or ground. The amplifier includes a multi-grid valve 84 having a control element 85 connected to a tap on coil 79. The valve also includes a suppressor grid 86 which is returned to ground, and it includes a cathode 87 which is also connected to ground through a cathode bias arrangement of a capacitor 89 and a shunting resistor 90. The screen element 92 of valve 84 is bypassed to ground through a capacitor 94 and connected to B+ through a resistor 95. A parallel tuned circuit composed of a capacitor 97 and a coil 98 is connected between screen element 92 and the anode element 99 of valve 84 while the anode applies the output signal of sound amplifier stage 75 through a capacitor 101 to further sound utilization stages 103. These latter stages may include a limiter, a detector and an audio amplifier, and a sound reproducer 104 is connected to the output of these stages.

A connection is made from the screen element 92 of valve 84 through resistor 106 to the control grid 107 of a gate valve 108. The control grid 107 is bypassed to ground through a capacitor 110 and connected to B++ through resistor 111. B+ potential is impressed on the cathode element 112 of valve 108, and the anode 113 of this valve is coupled through a capacitor 115 to the juncture of a pair of capacitors 117 and 118 which are series connected from cathode 49 of damper valve 48 to ground. Anode 113 is also connected to one side of variable resistor 120, while the other side of this resistor is connected to the junction of a pair of series-connected resistors 121 and 122. These series resistors are connected from a gain control point in intermediate frequency amplifier 17 to ground and are shunted by a capacitor 123. The movable arm of variable resistor 120 is connected through series-connected resistors 125 and 126 to the positive terminal B++, while the junction of these two resistors is connected through a resistor 128 to a gain control point in radio frequency amplifier 14, and to ground through capacitor 127. The gain control points in amplifiers 14 and 17 may be portions of these circuits at which the impression of a unidirectional potential will cause variation in the amplification characteristic of the circuits, such as for example the control grids 132 and 134 of variable mu amplifier valves 13 and 19.

The operation of a portion of the described receiver is similar to that of known circuits, but will be briefly reviewed here. Radio frequency amplifier 14 may be tuned to amplify a television signal intercepted by antenna 11 and 12, which signal may comprise an amplitude modulated video carrier and a frequency modulated sound carrier. The amplified signal is heterodyned in mixer oscillator 16 to develop an intermediate frequency signal corresponding to the selected intermediate frequency of the receiver. The resulting intermediate frequency signal is amplified in intermediate frequency amplifier 17, and detected in second detector 18 to produce a composite video signal. The composite video signal is amplified in video amplifier 34 and applied to the input electrodes of cathode-ray tube 60 to control the intensity of the cathode-ray beam therein in accordance with the image intelligence of the received television signal.

The synchronizing components of the television signal are separated from the composite video signal in separator 35, and these are applied to sweep systems 40 and 41 to synchronize the operation of these systems with the received television signal. The output of field sweep system 40 is coupled across the vertical deflection coil 62 to provide vertical deflection of the cathode-ray beam of cathode-ray tube 60. The output of line sweep system 41 is coupled through the output transformer 45 to the horizontal deflection coil 61 to provide the horizontal deflection of the cathode-ray beam. Damping diode 48 operates in a known manner to prevent oscillation in the horizontal sweep system, and finally the high voltage anode potential is supplied to tube 60 from transformer 45 through rectifier valve 54 in a customary circuit.

The intercarrier sound component of the received television signal is applied directly from the anode element of valve 29 in the second detector 18 across the network composed of capacitors 76 and 81, resistors 77 and 82 and coil 79, with a tap on the coil feeding the sound signal to the control grid of sound amplifier valve 84. After amplification in valve 84 the sound signal is selected by tuned circuit 97, 98 and impressed through coupling capacitor 101 on the other sound stages 103. As is usual in present day receivers, the sound signal at this point is a 4.5 mc. frequency modulated signal derived from the heterodyning of the sound and picture carriers in detector 18, and circuit 97, 98 is tuned to select this frequency. This signal then is limited, detected and amplified in stages 103, and applied to reproducer 104.

In addition to the 4.5 mc. intercarrier sound signal which is impressed on the grid 85 of valve 84 through capacitor 76 and a portion of coil 79, a direct-current potential also appears on this grid due to the direct-current coupling to the second detector. This potential is proportion to the amplitude level of the video signal existing at the second detector, which in turn corresponds to the intensity of the received television signal. The load resistor 30 and associated capacitor 31 develop this potential, and it is impressed upon grid 85 of sound amplifier valve 84 through the direct-current connection of resistor 77 and a portion of coil 79. Resistor 82 and capacitor 81 provide grid-leak action for grid 85. Thus with the direct-current bias on control grid 85 of the valve 84 varying according to the level of the direct-current potential coupled from the second detector, valve 84 functions not only as an amplifier valve for the intercarrier sound signal as previously described, but also as an amplifier for the direct-current potential applied to this grid from the second detector. The amplified direct-current potential from valve 84 is impressed on the control grid 107 of the gate valve 108 from the screen grid 92 of valve 84 through resistor 106.

Capacitor 94 has a sufficiently high capacity to filter high frequency variations in the potential appearing on the screen grid 92, and capacitor 110 provides further filtering at grid 107 of the valve 108. Voltage divider action, provided through resistors 95, 106 and 111, sets the potential axis about which the amplified direct-current potential coupled to grid 107 will vary.

It may be seen that as the signal intensity increases at the second detector valve 26, the bias on grid 85 of sound amplifier valve 84 will be driven in a negative direction and the potential applied to grid 107 of AGC valve 108 from the screen electrode 92 of valve 84 will rise.

The horizontal retrace or fly-back pulses developed by the line-sweep system appear across capacitors 117 and 118 with positive polarity, and these are applied through capacitor 115 to the anode element 113 of gate valve 108. These pulses may have individual amplitudes of the order of 600 volts, but each has a very short duration compared to its period. Therefore, the average value of the pulse train is relatively low. The B+ potential impressed on cathode 112 of the gate valve is of the order of 130 volts, and valve 108 maintains the peak potential appearing at anode 113 at a value relative to ground determined by its cathode potential and the bias applied to grid 107. Since the average value of the fly-back pulse is low and its peak value is held to a value in the region of the B+ potential by valve 108, this average will tend to appear across capacitors 123 and 127 as a charge negative with respect to ground potential. However, the negative charge thus developed will not be impressed upon grid 132 until it is sufficient to overcome delay voltages produced in the network of resistors 122, 120, 125 and 126. The junction point of resistors tends to have a slight positive value through voltage divider action of this network, but the potential at this point is maintained at zero or ground because of the "clamping" action or grid 132 in the radio-frequency amplifier as it is driven positive. Therefore, the potential on this grid will remain zero until the negative charge on capacitor 127 overcomes the positive potential that would appear across resistor were it not for the clamping action. Then as the charge goes further negative, grid 132 will be negatively biased. Increasing the resistance of a portion of resistor 120 can increase the delay on radio frequency amplifier stage 14 by increasing the positive voltage to be overcome by the charge on capacitor 127.

It can be seen that the voltage delay network supplies a selective AGC amplitude delay to the radio frequency amplifier 14 and intermediate frequency amplifier 17. That is, for medium intensity signals, only the radio frequency amplifier is controlled and its gain decreased. For higher intensity signals, both the radio frequency and the intermediate frequency amplifiers are controlled. The amplitude delay provided by the network can be set at any desired value by adjustment of variable resistor 120.

As previously mentioned, an increase in signal intensity at the second detector 18 causes the screen electrode of the sound amplifier to drive grid 107 of gate valve 108 in a positive direction. Therefore, valve 108 will conduct at a comparatively lower value of the fly-back pulse and the average value of the fly-back wave form will be lowered, thereby increasing the negative charge on capacitors 123 and 127 which reduces the amplification of stages 14 and 17 through conduction of a greater bias thereto. Valve 18, therefore, develops an amplified control potential that varies negatively with respect to ground and which may be used for automatic gain control.

The invention provides, therefore, an improved automatic gain control circuit for a television receiver or the like which is extremely simple and inexpensive to construct. The sound amplifier functions to amplify the sound signal as well as to amplify the direct current potential of the detected composite video signal. The amplified potential is then applied to a simple, pulsed triode amplifying valve to produce a suitable gain control potential on an appropriate axis for convenient automatic gain control.

While a particular embodiment of the invention has been shown and described, modifications may be made and it is intended in the appended claims to cover all such modifications as fall within the true spirit and scope of the invention.

What is claimed is:

1. A television receiver for utilizing a television signal having a video carrier amplitude modulated by video signals and a sound carrier frequency modulated by sound signals, including in combination, translating circuit means for selecting and amplifying the television signal, a detector having input and output portions, means coupling said detector input portion to said translating circuit means for demodulating said television signal to produce a composite video signal having a unidirectional potential component with an amplitude related to the intensity of the received television signal and also to produce a sound intercarrier signal, means coupled to said output portion of said detector for utilizing said composite video signal, and further means coupled to said output portion of said detector for utilizing said sound intercarrier signal, said further means including an amplifier having an electron discharge valve with an input electrode coupled through circuit means providing direct-current coupling to said detector, said electron discharge valve also having an output element, an output circuit coupled to said output element for deriving an amplified unidirectional potential varying in accordance with variations in said unidirectional potential component of said video signal, and circuit means connected to said output circuit for utilizing said amplified unidirectional potential to control the amplification of said translating circuit in inverse relation to the intensity of the received television signal.

2. A television receiver for utilizing a television signal having a video carrier amplitude modulated by video signals and a sound carrier frequency modulated by sound signals, including in combination, translating circuit means for selecting and amplifying the television signal and having a gain subject to variation in response to a direct current control potential, a detector having input and output portions, means coupling said detector input portion to said translating circuit means for demodulating said television signal to produce a composite video signal having a unidirectional potential component with an amplitude related to the intensity of the received television signal and also to produce a sound intercarrier signal, means coupled to said output portion of said detector for utilizing said composite video signal, and further means coupled to said output portion of said detector for utilizing said sound intercarrier signal, said further means including an amplifier having an electron discharge valve with an input electrode coupled through circuit means providing direct-current coupling to said detector, said electron discharge valve also having a screen electrode, an output circuit coupled to said screen electrode for deriving an amplified unidirectional potential varying in accordance with variations in said unidirectional potential component of said video signal, and circuit means connected to said output circuit for utilizing said amplified unidirectional potential to control the amplification of said translating circuit in inverse relation to the intensity of the received television signal.

3. A television receiver for utilizing a television signal having a video carrier amplitude modulated by video signals and a sound carrier frequency modulated by sound signals, including in combination, translating circuit means for selecting and amplifying the television signal and having a gain subject to variation in response to a direct current control potential, potential supply means, a detector having input and output portions, means coupling said detector input portion to said translating circuit means for demodulating said television signal to produce a composite video signal having a unidirectional potential component with an amplitude related to the level of the received television signal and also to produce a sound intercarrier signal, means coupled to said output portion of said detector for utilizing said composite video signal, and further means coupled to said output portion of said detector for utilizing said sound intercarrier signal, said further means including an amplifier having an electron discharge valve with an input electrode coupled through circuit means providing direct-current coupling to said detector, said electron discharge valve also having a screen electrode, an output impedance coupled between said screen electrode and said potential supply means for deriving an amplified unidirectional potential varying in accordance with variations in said unidirectional potential component of said video signal, and circuit means connected to said output circuit for utilizing said amplified unidirectional potential to control the amplification of said translating circuit in inverse relation to the intensity of the received television signal.

4. A television receiver for utilizing a television signal having a video carrier amplitude modulated by video signals and a sound carrier frequency modulated by sound signals, including in combination, translating circuit means for selecting and amplifying the television signal and having a gain subject to variation in response to a direct current control potential, a detector having input and output portions, means coupling said detector input portion to said translating circuit means for demodulating said television signal to produce a composite video signal having a unidirectional potential component with an amplitude related to the level of the received television signal and also to produce a sound intercarrier signal, means coupled to said output portion of said detector for utilizing said composite video signal, and further means coupled to said output portion of said detector for utilizing said sound intercarrier signal, said further means including an amplifier having an electron valve with an input electrode coupled through a direct-current coupling circuit to said output portion of said detector, said electron valve also having an output element, an output circuit coupled to said output element for deriving an amplified unidirectional potential varying in accordance with variations in said unidirectional potential component of said video signal, and automatic gain control circuit means connected to said output circuit for utilizing said amplified unidirectional potential to control the amplification of said translating circuit.

References Cited in the file of this patent

UNITED STATES PATENTS

| | | |
|---|---|---|
| 2,632,047 | Schlesinger | Mar. 17, 1953 |
| 2,773,119 | Parker | Dec. 4, 1956 |